(12) United States Patent
Ellis et al.

(10) Patent No.: US 12,662,116 B2
(45) Date of Patent: Jun. 23, 2026

(54) VEHICULAR DRIVING ASSIST SYSTEM WITH ENHANCED ESTIMATION OF OBJECTS

(71) Applicant: Magna Electronics Inc., Auburn Hills, MI (US)

(72) Inventors: Benjamin L. Ellis, Somerville, MA (US); Kevin S. O'Brien, Somerville, MA (US); Samuel Cerqueira Pinto, Medfield, MA (US)

(73) Assignee: Magna Electronics Inc., Auburn Hills, MI (US)

( * ) Notice: Subject to any disclaimer, the term of this patent is extended or adjusted under 35 U.S.C. 154(b) by 223 days.

(21) Appl. No.: 18/489,147

(22) Filed: Oct. 18, 2023

(65) Prior Publication Data

US 2024/0182026 A1     Jun. 6, 2024

Related U.S. Application Data

(60) Provisional application No. 63/380,136, filed on Oct. 19, 2022.

(51) Int. Cl.
B60W 30/12     (2020.01)
B60W 40/10     (2012.01)
B60W 60/00     (2020.01)

(52) U.S. Cl.
CPC ............ B60W 30/12 (2013.01); B60W 40/10 (2013.01); B60W 60/001 (2020.02); B60W 2520/105 (2013.01); B60W 2520/14 (2013.01); B60W 2520/16 (2013.01); B60W 2520/18 (2013.01); B60W 2556/20 (2020.02); B60W

*2556/35* (2020.02); *B60W 2556/40* (2020.02); *B60W 2556/50* (2020.02)

(58) Field of Classification Search
CPC .... B60W 30/12; B60W 40/10; B60W 60/001; B60W 2520/105; B60W 2520/14; B60W 2520/16; B60W 2520/18; B60W 2556/20; B60W 2556/35; B60W 2556/40; B60W 2556/50; G01C 21/30
USPC ......................................................... 701/41
See application file for complete search history.

(56) References Cited

U.S. PATENT DOCUMENTS

| | | |
|---|---|---|
| 7,877,175 B2 | 1/2011 | Higgins-Luthman |
| 7,881,496 B2 | 2/2011 | Camilleri et al. |
| 7,914,187 B2 | 3/2011 | Higgins-Luthman et al. |
| 7,914,188 B2 | 3/2011 | DeLine et al. |
| 7,930,160 B1 | 4/2011 | Hosagrahara et al. |

(Continued)

*Primary Examiner* — Scott A Reinbold
(74) *Attorney, Agent, or Firm* — HONIGMAN LLP

(57)     ABSTRACT

A vehicular control system includes a vehicle dynamics sensor disposed at a vehicle and capturing vehicle dynamics data representative of a state of motion of the vehicle. The vehicular control system, when the vehicle is at a first location on a road the vehicle is traveling along, determines the state of motion of the vehicle via processing of vehicle dynamics data captured by the vehicle dynamics sensor. The vehicular control system, after the vehicle has traveled along the road from the first location to a second location, predicts a second location of the vehicle based on the state of motion of the vehicle at the first location. The vehicular control system determines a sensitivity of the state of motion of the vehicle to change and corrects the predicted second location of the vehicle based at least in part on a global positioning system of the vehicle.

20 Claims, 9 Drawing Sheets

(56) References Cited

U.S. PATENT DOCUMENTS

| | | | |
|---|---|---|---|
| 7,949,486 B2 | 5/2011 | Denny et al. | |
| 7,991,522 B2 | 8/2011 | Higgins-Luthman | |
| 8,017,898 B2 | 9/2011 | Lu et al. | |
| 8,064,643 B2 | 11/2011 | Stein et al. | |
| 8,082,101 B2 | 12/2011 | Stein et al. | |
| 8,095,310 B2 | 1/2012 | Taylor et al. | |
| 8,164,628 B2 | 4/2012 | Stein et al. | |
| 8,224,031 B2 | 7/2012 | Saito | |
| 8,233,045 B2 | 7/2012 | Luo et al. | |
| 8,254,635 B2 | 8/2012 | Stein et al. | |
| 8,300,886 B2 | 10/2012 | Hoffmann | |
| 8,378,851 B2 | 2/2013 | Stein et al. | |
| 8,421,865 B2 | 4/2013 | Euler et al. | |
| 8,694,224 B2 | 4/2014 | Chundrlik, Jr. et al. | |
| 9,205,776 B2 | 12/2015 | Turk | |
| 9,764,744 B2 | 9/2017 | Bajpai | |
| 2006/0006309 A1* | 1/2006 | Dimsdale | G01S 17/89 |
| | | | 250/206.1 |
| 2009/0290032 A1 | 11/2009 | Zhang et al. | |
| 2010/0253784 A1 | 10/2010 | Oleg | |
| 2011/0216201 A1 | 9/2011 | McAndrew et al. | |
| 2012/0045112 A1 | 2/2012 | Lundblad et al. | |
| 2012/0069185 A1 | 3/2012 | Stein | |
| 2012/0200707 A1 | 8/2012 | Stein et al. | |
| 2012/0314071 A1 | 12/2012 | Rosenbaum et al. | |
| 2012/0320209 A1 | 12/2012 | Vico et al. | |
| 2013/0141580 A1 | 6/2013 | Stein et al. | |
| 2013/0147957 A1 | 6/2013 | Stein | |
| 2013/0169812 A1 | 7/2013 | Lu et al. | |
| 2013/0286193 A1 | 10/2013 | Pflug | |
| 2014/0043473 A1 | 2/2014 | Gupta et al. | |
| 2014/0063254 A1 | 3/2014 | Shi et al. | |
| 2014/0098229 A1 | 4/2014 | Lu et al. | |
| 2014/0160291 A1 | 6/2014 | Schaffner | |
| 2014/0247352 A1 | 9/2014 | Rathi et al. | |
| 2014/0247354 A1 | 9/2014 | Knudsen | |
| 2014/0320658 A1 | 10/2014 | Pliefke | |
| 2014/0333729 A1 | 11/2014 | Pflug | |
| 2014/0347486 A1 | 11/2014 | Okouneva | |
| 2021/0086795 A1* | 3/2021 | Zhao | G05D 1/0274 |
| 2022/0242401 A1* | 8/2022 | Thompson | G06F 1/14 |

* cited by examiner

1

VEHICULAR DRIVING ASSIST SYSTEM WITH ENHANCED ESTIMATION OF OBJECTS

CROSS REFERENCE TO RELATED APPLICATION

The present application claims the filing benefits of U.S. provisional application Ser. No. 63/380,136, filed Oct. 19, 2022, which is hereby incorporated herein by reference in its entirety.

FIELD OF THE INVENTION

The present invention relates generally to a vehicular control system and, more particularly, to a vehicular control system that uses one or more sensors to localize the vehicle.

BACKGROUND OF THE INVENTION

Use of global positioning system (GPS) sensors in vehicle control systems is common and known. These systems use location data provided by the GPS sensor to localize the vehicle to a global frame.

SUMMARY OF THE INVENTION

A vehicular control system includes a vehicle dynamics sensor disposed at a vehicle equipped with the vehicular control system. The vehicle dynamics sensor captures vehicle dynamics data representative of a state of motion of the vehicle that includes (i) an acceleration of the vehicle and (ii) an angular velocity of the vehicle. The system includes an electronic control unit (ECU) with electronic circuitry and associated software. Vehicle dynamics data captured by the vehicle dynamics sensor is transferred to and is processed at the ECU. The vehicular control system, when the vehicle is at a first location on a road the vehicle is traveling along, determines the state of motion of the vehicle at the first location via processing of vehicle dynamics data captured by the vehicle dynamics sensor and transferred to the ECU. The vehicular control system is operable to determine sensitivity of the state of motion of the vehicle to change in at least one selected from the group consisting of (i) pitch of the vehicle, (ii) roll of the vehicle and (iii) yaw of the vehicle. The vehicular control system determines sensitivity of the state of motion of the vehicle at the first location. The vehicular control system, after the vehicle has traveled along the road from the first location, predicts a second location of the vehicle based on (i) the state of motion of the vehicle at the first location, (ii) the determined sensitivity of the state of motion of the vehicle at the first location and (iii) map data. The vehicular control system maneuvers the vehicle based on the predicted second location of the vehicle.

These and other objects, advantages, purposes and features of the present invention will become apparent upon review of the following specification in conjunction with the drawings.

2

Figure 3:
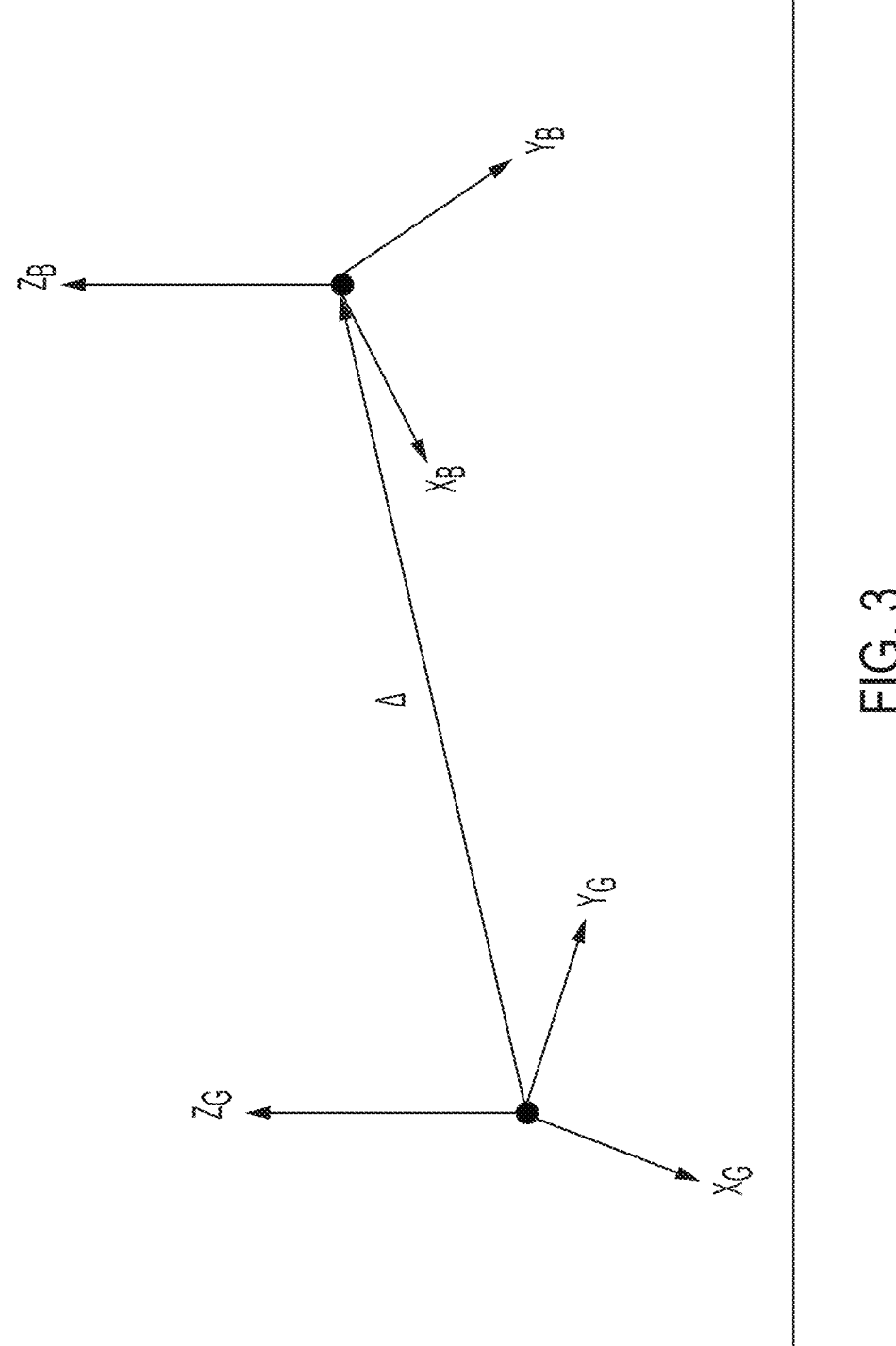
Figure 4:
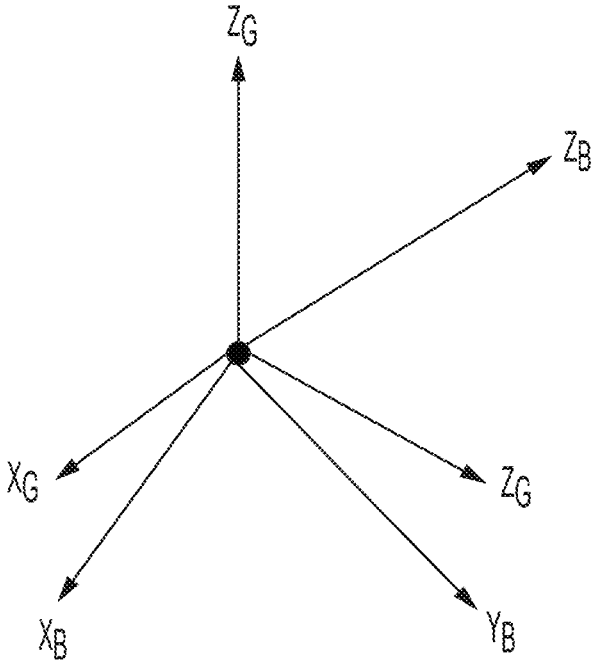
Figure 5:
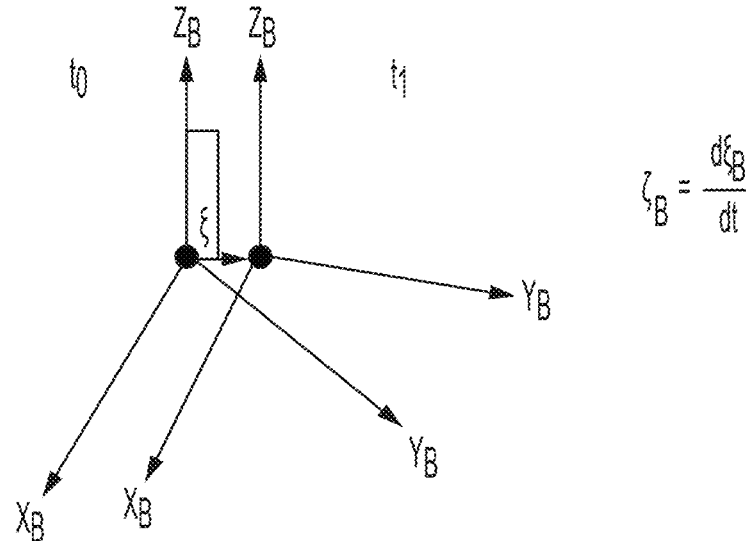
Figure 6:
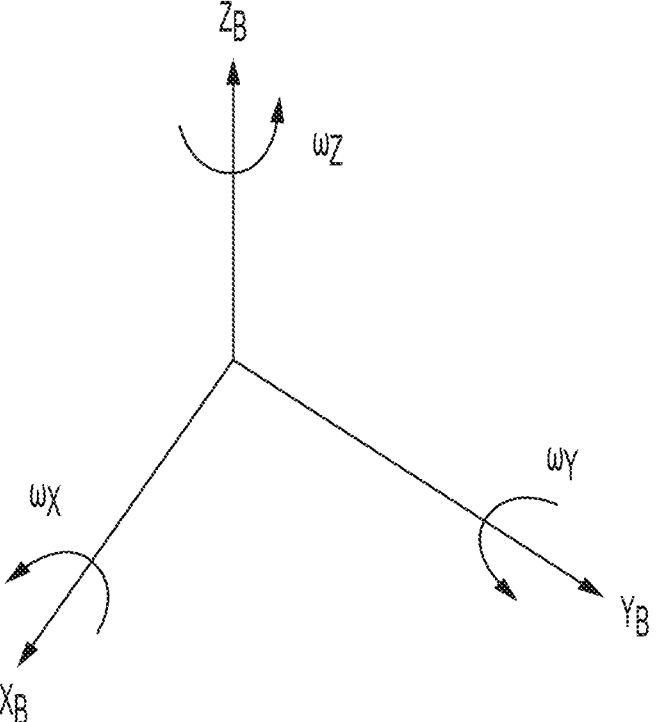

FIG. 3 is a schematic view of a translation between a body frame and a global frame;

FIG. 4 is a schematic view of a rotation between a body frame and a global frame;

FIG. 5 is a schematic view of a body-frame linear velocity and time derivative of a displacement of the body-frame;

FIG. 6 is a schematic view of body-frame angular velocity; and

Figure 7:
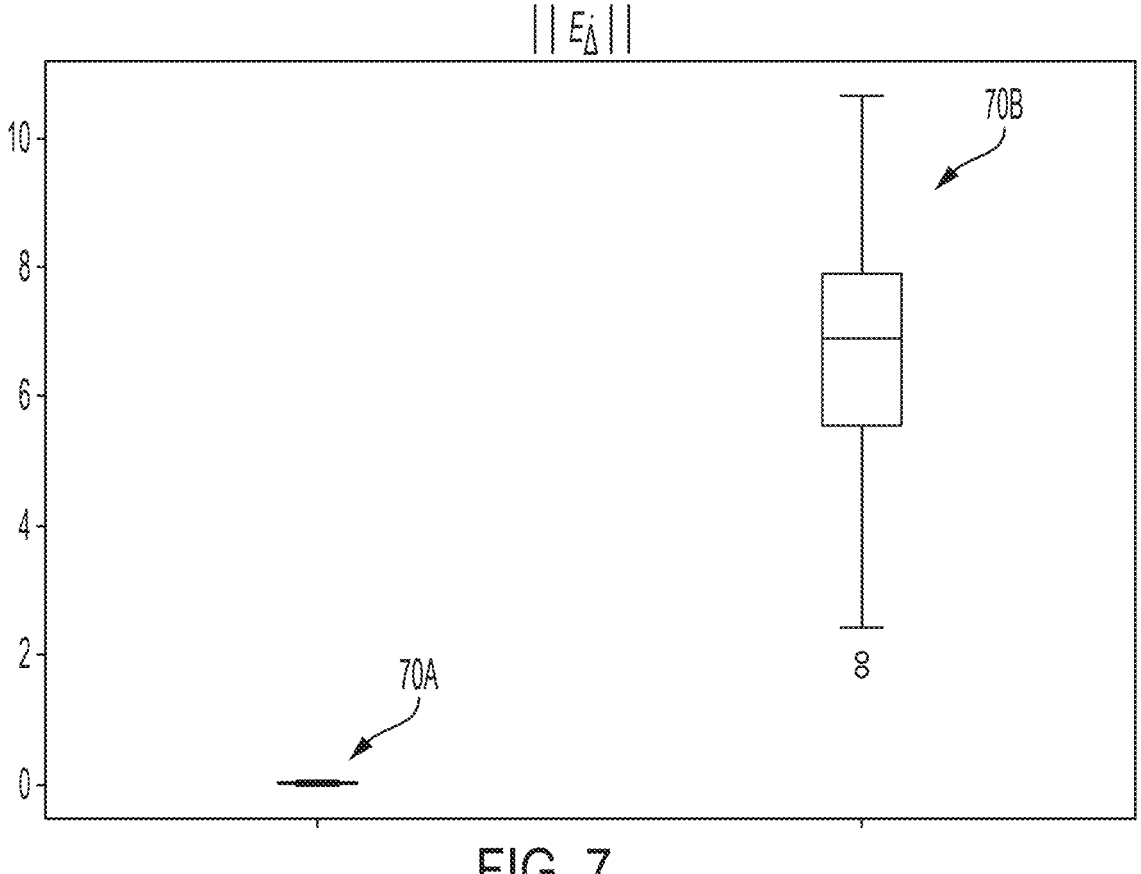
Figure 8:
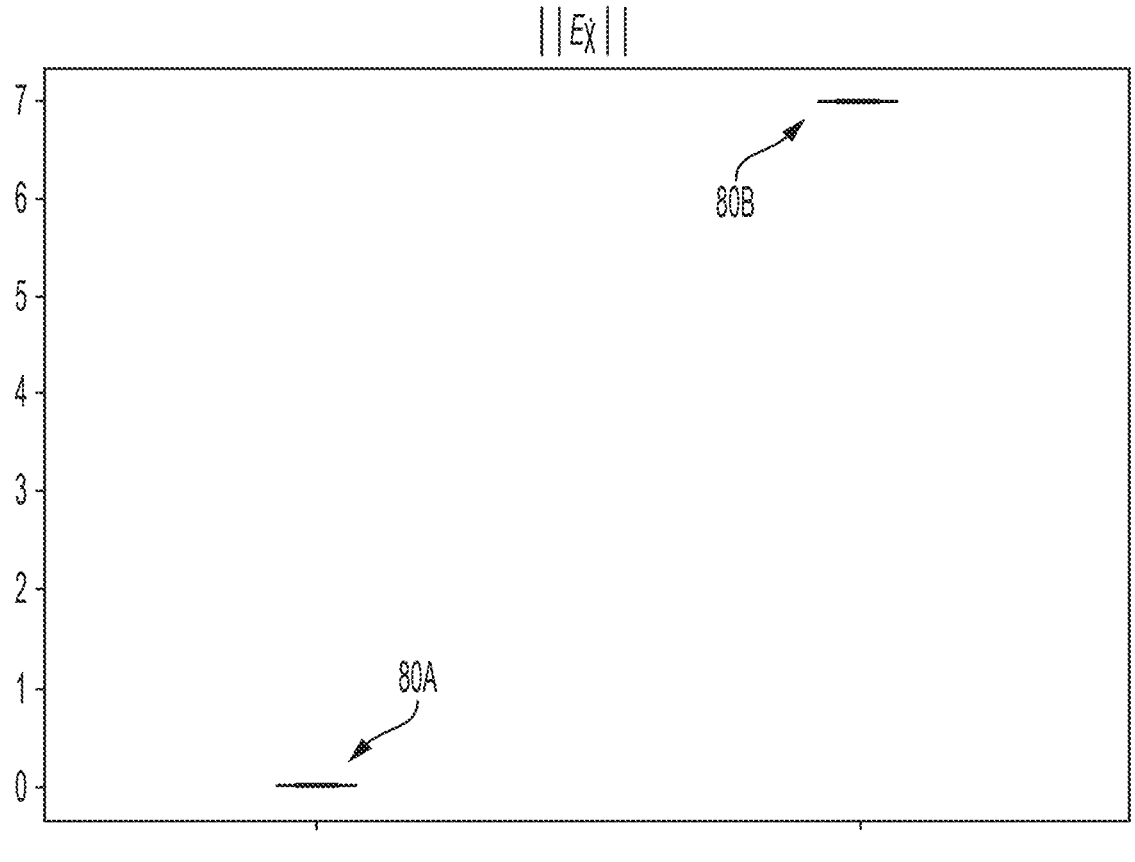
Figure 9:
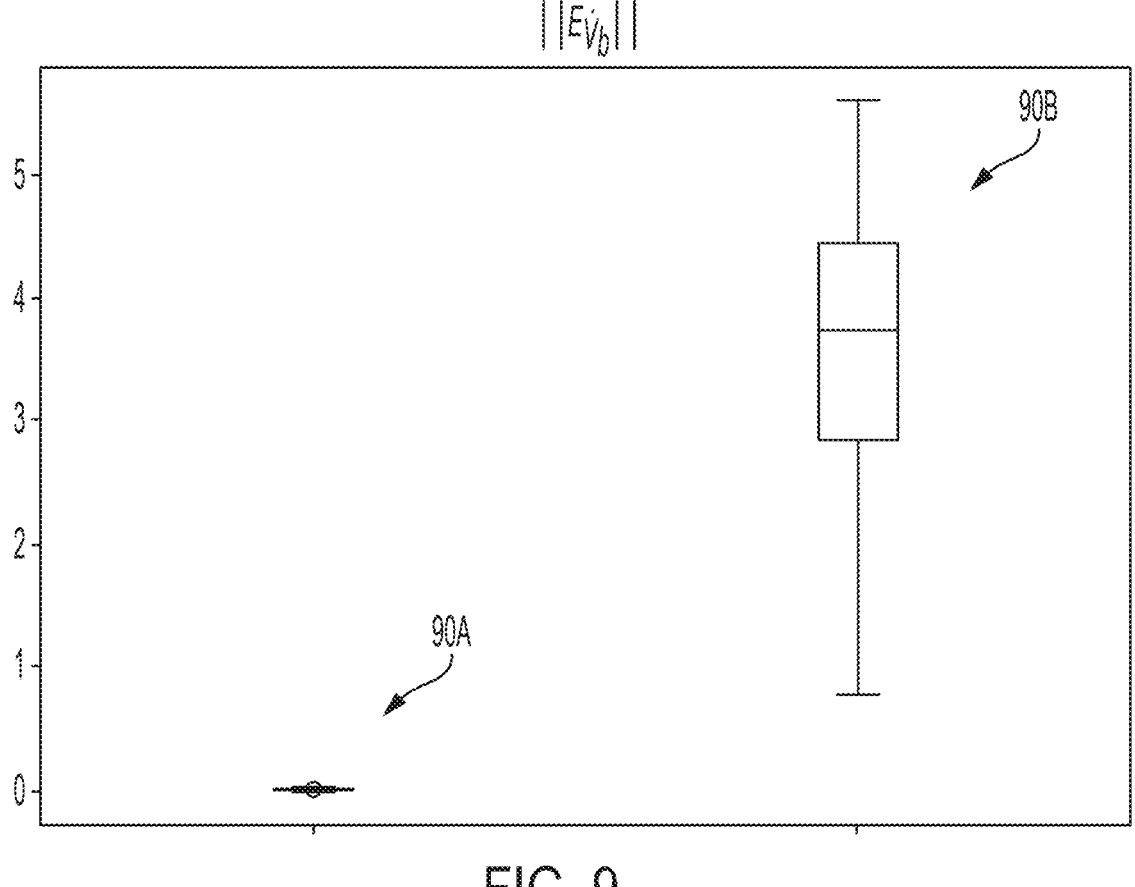

FIGS. 7-9 are plots of error in predicting locations using different localization techniques.

DESCRIPTION OF THE PREFERRED EMBODIMENTS

A vehicle driving assist system and/or vehicular control system operates to capture sensor data and process the sensor data to determine a current location of the vehicle. The system uses the current location of the vehicle to plan a route/path of the vehicle and/or maneuver the vehicle. For example, the system, based on the current location of the vehicle, maneuvers the vehicle to maintain a central position within a lane the vehicle is traveling along. The system includes a processor or processing system that is operable to receive sensor data from one or more localization sensors and/or vehicle dynamics sensors such as global positioning system (GPS) sensors, inertial measurement unit (IMU) sensors, accelerometers, etc.

Referring now to the drawings and the illustrative embodiments depicted therein, a vehicle 10 includes a control system 12 that includes at least one localization sensor 16. For example, the localization sensor is a GPS sensor 16 that captures location data representative of a global position of the vehicle. The control system 12 includes a control or electronic control unit (ECU) 18 having electronic circuitry and associated software, with the electronic circuitry including a data processor that is operable to process sensor data captured by the localization sensor(s). The ECU may, for example, plan paths and/or maneuver the vehicle autonomously or semi-autonomously based on determined locations of the vehicle. The system 12 also includes at least one vehicle dynamics sensor 20 that captures vehicle dynamics data representative of a state of motion of the vehicle (e.g., such as a velocity of the vehicle, an acceleration of the vehicle, a rotation/yaw of the vehicle, etc.). For example, the vehicle dynamics sensor 20 includes an IMU and/or an accelerometer. The ECU may predict a location of the vehicle and/or update a predicted location (i.e., an initial predicted location) of the vehicle based on sensor data from both the localization sensor and the vehicle dynamics sensor. The data transfer or signal communication from the sensors to the ECU may comprise any suitable data or communication link, such as a vehicle network bus or the like of the equipped vehicle.

Tracking or planning the movement of rigid bodies is essential to a variety of technologies, such as autonomous vehicle localization. Implementations herein include a vehicular control system that includes model-based movement tracking/planning. Conventional systems rely on data-driven methods that learn a mathematical description of movement of an object based on examples. In contrast, the system described herein uses mathematical models derived from the physics of an object's motion (e.g., kinematics) to track/predict movement of a vehicle. The advantages of a model-based approach include preserving the ability to easily adapt the framework to other rigid bodies and requiring only the measurement of some of the characteristics of the rigid body, such as its mass.

Computationally tractable algorithms for rigid body motion tracking and planning often rely on first order approximation methods. Some examples include non-linear trajectory optimization, which explicitly uses the rigid body dynamics as part of an optimization problem and solves it using first order methods (i.e., gradient descent). Other examples include the usage of extended Kalman filters for tracking the states, where a first order approximation of the dynamics is necessary for the correct propagation of the track state uncertainty, and thus, correct merging of state and measurement uncertainties in optimal filtering.

Figure 1:
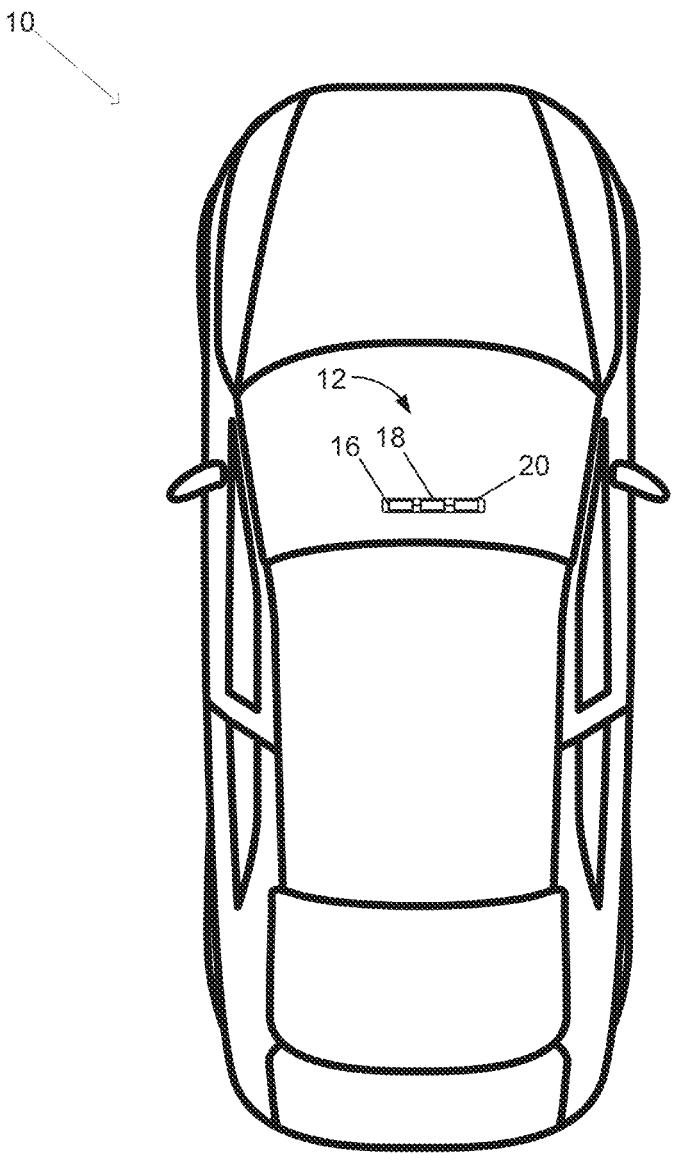
FIG. 1 is a plan view of a vehicle with a control system that incorporates sensors.
Figure 2:
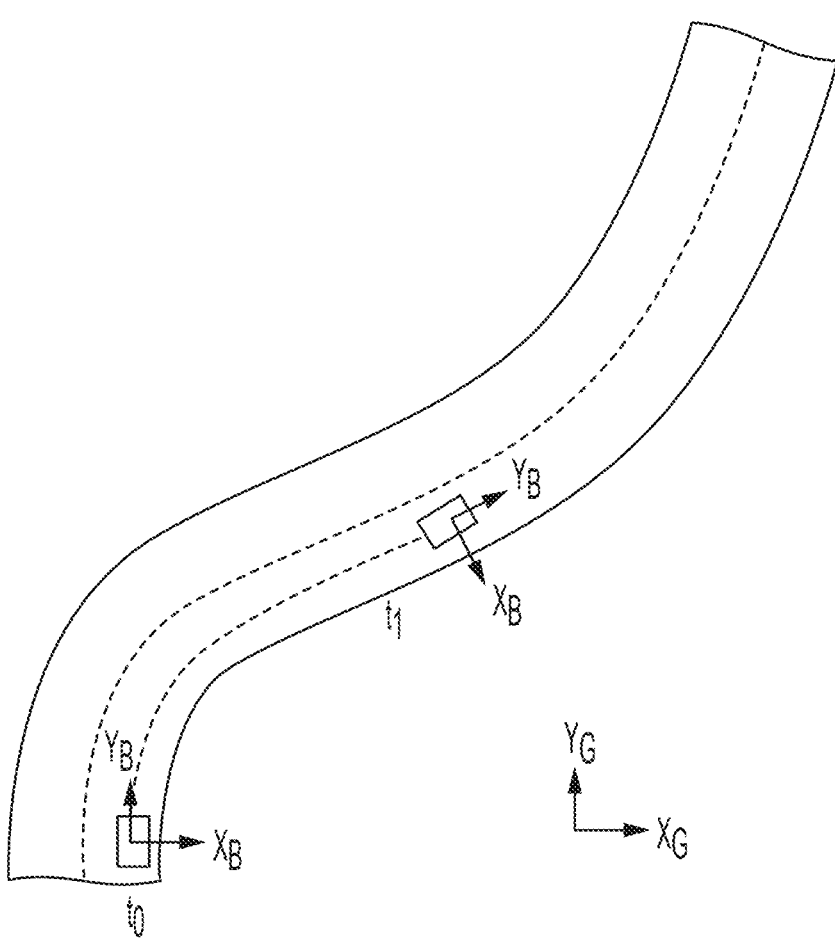
FIG. 2 is a schematic view of a heading change of a vehicle between two different time steps.

Another representation of the rigid body state uses, as discussed in more detail below, exponential coordinates to represent the rigid body rotation. However, conventional methods include a major disadvantage based on an assumption that the rotations with respect to the initial rotation of the body of the object remain small during the entire motion tracking process. In real world applications, such as in the automotive world, at least the rotation with respect to the vertical axis (i.e., the yaw angle) is frequently subject to major changes during the object's motion (e.g., as the vehicle turns). Often, the pitch and roll angles are also substantially perturbed during the course of the motion (e.g., as the vehicle travels up and down hills). In these cases, the expressions for first-order approximations using conventional methods yield high errors (FIGS. 7-9). FIG. 2 illustrates a heading change of a vehicle between two different time steps (i.e., $t_0$ and $t_1$) of the same rigid body (i.e., a vehicle as the vehicle travels along a road and first passes through a first point at time step $t_0$ and then passes through a second point at time $t_1$.). As illustrated in this example, even in nominal conditions, small heading changes (i.e., yaw changes from the vehicle turning to follow the road) may not be achievable throughout the entire trajectory. Here, the subscript B refers to the body-frame (i.e., a reference relative to the vehicle) and G to the global frame (i.e., a global reference).

Thus, a vehicular driving assist system or vehicular control system herein includes a method for computing first order approximations of the motion of objects (e.g., vehicle localization) that does not rely on the assumption that angular disturbances remain small over the course of the object's motion. Instead, the system determines a sensitivity of the state of motion of the vehicle to change (e.g., using a Jacobian of the state of motion). The system may apply this method to any three-dimensional (3D) rotation and enables higher performance for long term motion planning or tracking. For example, the system may more accurately determine a confidence in the model-based approach to localization (e.g., based on the sensitivity), allowing the system to more accurately weight/fuse other localization methods (e.g., using GPS sensors). For example, the system determines weights for a localization sensor (e.g., a GPS sensor) based on the determined sensitivity.

Generally, the state of a rigid body (i.e., a vehicle) with respect to a fixed global frame is described using its translation $\Delta = [x, y, z]$ of the body frame with respect to the fixed global frame. As shown in FIG. 3, the translation between the body frame and the global frame is the 3D vector $\Delta$ that captures the displacement between the global and body frames. The state is also described using its rotation matrix $R \in \mathbb{R}^{3 \times 3}$ of the body frame with respect to the fixed global frame. As shown in FIG. 4, the rotation between the body (i.e., the vehicle) and global frame is the transformation that would make the body and global frames aligned if their origins coincided. Finally, the state is also described using the body-frame linear velocity $v_b$. As shown in FIG. 5, the body-frame linear velocity is the time derivative of the displacement of the body-frame (i.e. the time derivative of $\xi$ represented in the instantaneous body-frame coordinates. The dynamics of these variables are given by:

$$\dot{\Delta} = R v_b \tag{1}$$

$$\dot{R} = R w_b^{\wedge} \tag{2}$$

$$\dot{v}_b = -w_b \times v_b + R^T \bar{g} + a_b \tag{3}$$

Here, $\bar{g}$ is the gravity vector in global coordinates, $a_b$ is the acceleration in the body frame and $(\bullet)^{\wedge}: \mathbb{R}^3 \rightarrow \mathbb{R}^{3 \times 3}$ is the skew operator, which converts a 3D vector into a 3×3 skew-symmetric matrix according to the following relation:

$$\left( \begin{bmatrix} w_x \\ w_y \\ w_z \end{bmatrix} \right)^{\wedge} = \begin{bmatrix} 0 & -w_z & w_y \\ w_z & 0 & -w_x \\ -w_y & w_x & 0 \end{bmatrix} \tag{4}$$

Inertial measurement units (IMUs) are common sensors for rigid body movement tracking. These sensors produce, after calibration, measurements of body-frame linear acceleration (i.e., $a_b$, the time derivative of $v_b$) and body frame angular velocities ($\omega_b$, as represented in FIG. 6). FIG. 6 illustrates the body-frame angular velocity. The components of $\omega_b$ are the angular velocities (in radians) among the body-frame axes. Thus, the differential equations discussed herein use $a_b$ and $\omega_b$ as inputs.

One key property of rotation matrices is that they belong to a subspace of $\mathbb{R}^{3 \times 3}$ that has 3 dimensions. Therefore, a compact, three dimensional representation of the rotation matrices is achievable. Exponential coordinates have the advantage of both representing the dynamics using smooth differential equations and also compactly representing the set of rotations using only three coordinates. The exponential coordinates representation uses a 3D vector $\chi = [\chi_x, \chi_y, \chi_z]$ such that $R(\chi) = \exp(\chi^{\wedge})$, and the exponential of a matrix is defined as:

$$\exp(M) = \sum_{k=0}^{\infty} \frac{M^k}{k!} \tag{5}$$

One property of skew-symmetric matrices M is that $M^3 = -M$. Therefore, in the case of exponential coordinate representation, it follows that:

$$\exp(\hat{\chi}) = I + \frac{\sin(\|\chi\|)}{\|\chi\|} \hat{\chi} + \frac{1 - \cos(\|\chi\|)}{\|\chi\|^2} (\hat{\chi})^2 \tag{6}$$

It is known that this exponential coordinate representation is a complete representation of rotations, i.e., every rotation can be represented using exponential coordinates and every exponential coordinate has a corresponding rotation. One of the benefits of this representation is that the rotation dynamics can be represented in a very compact manner. Substituting the exponential coordinate definition into Equation (2) results in:

$$\exp(\hat{\chi})\dot{\hat{\chi}} = \exp(\hat{\chi})\hat{w}_b \Rightarrow \dot{\chi} = w_b \tag{7}$$

5

When using the exponential coordinates representation for rotation, the state of the rigid body may be represented as a 9-dimensional vector containing the translation, the rotation (represented in terms of the exponential coordinates), and the body-frame linear velocity. This 9-dimensional vector is denoted as s and its dynamics are given by:

$$\dot{s} = \begin{bmatrix} \dot{\Delta} \\ \dot{\chi} \\ \dot{v}_b \end{bmatrix} = \begin{bmatrix} \exp(\hat{\chi})v_b \\ w_b \\ -\hat{w}_b v_b + \exp(\hat{\chi})^T \bar{g} + a_b \end{bmatrix} \tag{8}$$

Implementations herein approximate how sensitive the dynamics of the rigid body are with respect to its current state (i.e., how susceptible the dynamics are to change in pitch, roll, or yaw of the vehicle) by determining $$\frac{\partial \dot{s}}{\partial s},$$

which is also denoted as the Jacobian of ṡ. This is an improvement over conventional techniques, as conventional techniques include linearizations that assume $\|\chi\|$ is small, which is often not the case in real-world uses of the linearization.

To simplify the notation, $$\frac{\partial \dot{s}}{\partial s}$$

may be represented as:

$$\frac{\partial \dot{s}}{\partial s} = \begin{bmatrix} \dfrac{\partial \dot{\Delta}}{\partial \Delta} & \dfrac{\partial \dot{\Delta}}{\partial \chi} & \dfrac{\partial \dot{\Delta}}{\partial v_b} \\ \dfrac{\partial \dot{\chi}}{\partial \Delta} & \dfrac{\partial \dot{\chi}}{\partial \chi} & \dfrac{\partial \dot{\chi}}{\partial v_b} \\ \dfrac{\partial \dot{v}_b}{\partial \Delta} & \dfrac{\partial \dot{v}_b}{\partial \chi} & \dfrac{\partial \dot{v}_b}{\partial v_b} \end{bmatrix} \tag{9}$$

Expressions for each of the derivatives of the matrix in Equation (9) are provided by Equations (10)-(18) below.

$$\frac{\partial \dot{\Delta}}{\partial \Delta} = 0_{3 \times 3} \tag{10}$$

$$\frac{\partial \dot{\Delta}}{\partial \chi} = -\exp(\hat{\chi})v_b \frac{\chi \chi^T + (\exp(\hat{\chi}) - I)\hat{\chi}}{\|\chi\|^2} \tag{11}$$

$$\frac{\partial \dot{\Delta}}{\partial v_b} = \exp(\hat{\chi}) \tag{12}$$

$$\frac{\partial \dot{\chi}}{\partial \Delta} = 0_{3 \times 3} \tag{13}$$

$$\frac{\partial \dot{\chi}}{\partial \chi} = 0_{3 \times 3} \tag{14}$$

$$\frac{\partial \dot{\chi}}{\partial v_b} = 0_{3 \times 3} \tag{15}$$

$$\frac{\partial \dot{v}_b}{\partial \Delta} = 0_{3 \times 3} \tag{16}$$

$$\frac{\partial \dot{v}_b}{\partial \chi} = -\frac{\sin(\|\chi\|)}{\|\chi\|} \bar{g}^{(\exp(\hat{\chi}))^2} - \cos(\|\chi\|)\chi \bar{g}^T \exp(\hat{\chi})^T + \tag{17}$$

6

-continued $$\frac{\cos(\|\chi\|) - 1}{\|\chi\|}\left((\exp(\hat{\chi})^T \bar{g})I + \chi^T \bar{g}\exp(\hat{\chi})^2\right) + \sin(\|\chi\|)\exp(\hat{\chi})^2 \bar{g}\chi^T$$

$$\frac{\partial \dot{v}_b}{\partial v_b} = -\omega_b{}^{\wedge} \tag{18}$$

This approach provides superior accuracy (i.e., more accurately determines the sensitivity of the dynamics of the vehicle) for vehicle localization compared to conventional methods. The system may use this accuracy or sensitivity (e.g., based on a Jacobian) to determine better weights to assign to different localization methods when fusing or combining data. For example, the system may determine an accuracy or weight of a localization sensor (e.g., a GPS sensor) based at least in part on the sensitivity of the dynamics. Optionally, the system may predict a current location of the vehicle based on a previous location of the vehicle, the motion of the vehicle, and/or data derived from the localization sensor (e.g., fused with the motion of the vehicle). A system of the vehicle (such as a vehicular control system) may maneuver or control the vehicle based on the predicted location (e.g., control lateral or longitudinal movement of the vehicle). To evaluate the accuracy of the derivatives with respect to χ, Equation (19) below expresses the numerical derivative:

$$\frac{\partial \hat{f}}{\partial \chi_i}(s) = \frac{f(s_{\delta e_{\chi_i}}) - f(s)}{\delta}, \frac{\partial \hat{f}}{\partial \chi}(s) \begin{bmatrix} \dfrac{\partial \hat{f}}{\partial \chi_x} \\ \dfrac{\partial \hat{f}}{\partial \chi_y} \\ \dfrac{\partial \hat{f}}{\partial \chi_z} \end{bmatrix} \tag{19}$$

Here, $e_{\chi i}$ is the unit vector at the direction $\chi_i$ and δ is a small and predefined constant. The error between a numerically estimated and the computed derivative of a function $f$ with respect to χ at state s is defined as:

$$\|E_f(S)\|_F = \left\| \frac{\partial \hat{f}}{\partial \chi}(s) - \frac{\partial f_{computed}}{\partial \chi}(s) \right\|_F \tag{20}$$

Here, $\|\bullet\|_F$ is the Frobenius norm of a matrix (i.e., the root mean square value of its eigenvalues). FIGS. 7-9 illustrate the norm of errors of Jacobian matrices using techniques described herein versus conventional techniques. Note that the set of all possible χ is a three-dimensional set, so to facilitate the representation of the result, the plots of FIGS. 7-9 sample the three-dimensional sphere of radius π and include, for both approaches, the mean and standard deviation of the set $\{\|E_f(s_j)\|, 1 \le j \le N_{samples}\}$ where $s_j$ is the j-th sample of the three-dimensional sphere. Specifically, FIG. 7 includes a first error 70A (representing the error of the system described herein) and a second error 70B (representing the error conventional techniques) with the Jacobian of Δ with respect to χ. The first error 70A is substantially lower than the second error 80B, which is advantageous in determining a confidence in the system. FIG. 8 illustrates a first error 80A (representing the error of the system described herein) and a second error 80B (representing the error conventional techniques) with the Jacobian of with χ respect to χ. FIG. 9 illustrates a first error 90A (representing the error of the system described herein) and a second error 90B (representing the error conventional techniques) with the Jacobian of with $\dot{v}_b$ respect to $\chi$.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least three million photosensor elements or pixels or at least 5 million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. U.S.-2014-0340510; U.S.-2014-0313339; U.S.-2014-0347486; U.S.-2014-0320658; U.S.-2014-0336876; U.S.-2014-0307095; U.S.-2014-0327774; U.S.-2014-0327772; U.S.-2014-0320636; U.S.-2014-0293057; U.S.-2014-0309884; U.S.-2014-0226012; U.S.-2014-0293042; U.S.-2014-0218535; U.S.-2014-0218535; U.S.-2014-0247354; U.S.-2014-0247355; U.S.-2014-0247352; U.S.-2014-0232869; U.S.-2014-0211009; U.S.-2014-0160276; U.S.-2014-0168437; U.S.-2014-0168415; U.S.-2014-0160291; U.S.-2014-0152825; U.S.-2014-0139676; U.S.-2014-0138140; U.S.-2014-0104426; U.S.-2014-0098229; U.S.-2014-0085472; U.S.-2014-0067206; U.S.-2014-0049646; U.S.-2014-0052340; U.S.-2014-0025240; U.S.-2014-0028852; U.S.-2014-005907; U.S.-2013-0314503; U.S.-2013-0298866; U.S.-2013-0222593; U.S.-2013-0300869; U.S.-2013-0278769; U.S.-2013-0258077; U.S.-2013-0258077; U.S.-2013-0242099; U.S.-2013-0215271; U.S.-2013-0141578 and/or U.S.-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular control system, the vehicular control system comprising:

a vehicle dynamics sensor disposed at a vehicle equipped with the vehicular control system, wherein the vehicle dynamics sensor captures vehicle dynamics data representative of a state of motion of the vehicle, and wherein the vehicle dynamics data comprises (i) an acceleration of the vehicle and (ii) an angular velocity of the vehicle;

an electronic control unit (ECU) comprising electronic circuitry and associated software;

wherein vehicle dynamics data captured by the vehicle dynamics sensor is transferred to and is processed at the ECU;

wherein the vehicular control system, when the vehicle is at a first location on a road the vehicle is traveling along, determines the state of motion of the vehicle at the first location via processing of vehicle dynamics data captured by the vehicle dynamics sensor and transferred to the ECU, and wherein the state of motion is represented by a nine-dimensional vector comprising a translation, a rotation represented in exponential coordinates, and a body-frame linear velocity;

wherein the vehicular control system is operable to determine sensitivity of the state of motion of the vehicle to change in at least one selected from the group consisting of (i) pitch of the vehicle, (ii) roll of the vehicle and (iii) yaw of the vehicle by determining a Jacobian of a dynamic model of the state of motion;

wherein the vehicular control system determines the Jacobian representing the sensitivity of the state of motion of the vehicle at the first location;

wherein the vehicular control system, after the vehicle has traveled along the road from the first location, predicts a second location of the vehicle based on (i) the state of motion of the vehicle at the first location, (ii) the determined Jacobian and (iii) map data; and wherein the vehicular control system maneuvers the vehicle based on the predicted second location of the vehicle.

2. The vehicular control system of claim 1, wherein the vehicular control system predicts the second location of the vehicle by predicting an initial second location of the vehicle based on the state of motion of the vehicle at the first location and adjusting the predicted initial second location of the vehicle based at least in part on (i) the determined sensitivity of the state of motion of the vehicle at the first location and (ii) a global positioning system of the vehicle.

3. The vehicular control system of claim 2, wherein the vehicular control system adjusts the predicted initial second location of the vehicle by fusing the predicted second location of the vehicle with the map data.

4. The vehicular control system of claim 3, wherein the vehicular control system, when fusing the predicted initial second location of the vehicle with the map data, weights the map data based on the determined sensitivity.

5. The vehicular control system of claim 2, wherein the vehicular control system adjusts the predicted second location of the vehicle by determining a confidence of the predicted second location based on the determined sensitivity.

6. The vehicular control system of claim 1, wherein the map data is derived from an output of a global positioning system of the vehicle.

7. The vehicular control system of claim 1, wherein the state of motion of the vehicle comprises (i) a position of the vehicle, (ii) a rotation of the vehicle, and (iii) a velocity of the vehicle.

8. The vehicular control system of claim 1, wherein the vehicle dynamics sensor comprises an inertial measurement unit (IMU).

9. The vehicular control system of claim 1, wherein the vehicular control system determines an exponential coordinates representation of the state of motion of the vehicle.

10. The vehicular control system of claim 1, wherein the vehicular control system determines the sensitivity of the state of motion of the vehicle based on the Jacobian of a matrix representing the state of motion of the vehicle.

11. The vehicular control system of claim 10, wherein the Jacobian of the matrix representing the state of motion of the vehicle comprises a twelve by twelve matrix.

12. A vehicular control system, the vehicular control system comprising:

a vehicle dynamics sensor disposed at a vehicle equipped with the vehicular control system, wherein the vehicle dynamics sensor captures vehicle dynamics data representative of a state of motion of the vehicle, and wherein the vehicle dynamics data comprises (i) an acceleration of the vehicle and (ii) an angular velocity of the vehicle;

an electronic control unit (ECU) comprising electronic circuitry and associated software;

wherein vehicle dynamics data captured by the vehicle dynamics sensor is transferred to and is processed at the ECU;

wherein the vehicular control system, when the vehicle is at a first location on a road the vehicle is traveling along, determines the state of motion of the vehicle at the first location via processing of vehicle dynamics data captured by the vehicle dynamics sensor and transferred to the ECU, and wherein the state of motion is represented by a nine-dimensional vector comprising a translation, a rotation represented in exponential coordinates, and a body-frame linear velocity;

wherein the vehicular control system is operable to determine sensitivity of the state of motion of the vehicle to change in at least one selected from the group consisting of (i) pitch of the vehicle, (ii) roll of the vehicle and (iii) yaw of the vehicle by determining a Jacobian of a dynamic model of the state of motion;

wherein the vehicular control system determines the Jacobian representing the sensitivity of the state of motion of the vehicle at the first location;

wherein the vehicular control system, after the vehicle has traveled along the road from the first location, predicts a second location of the vehicle based on the state of motion of the vehicle at the first location and adjusting the predicted second location of the vehicle based at least in part on (i) the determined Jacobian and (ii) a global positioning system of the vehicle; and wherein the vehicular control system maneuvers the vehicle based on the predicted second location of the vehicle.

13. The vehicular control system of claim 12, wherein the vehicular control system adjusts the predicted second location of the vehicle by fusing the predicted second location of the vehicle with map data associated with the global positioning system of the vehicle.

14. The vehicular control system of claim 13, wherein the vehicular control system, when fusing the predicted second location of the vehicle with the map data, weights the map data based on the determined sensitivity.

15. The vehicular control system of claim 12, wherein the vehicular control system adjusts the predicted second location of the vehicle by determining a confidence of the predicted second location based on the determined sensitivity.

16. A vehicular control system, the vehicular control system comprising:

an inertial measurement unit (IMU) disposed at a vehicle equipped with the vehicular control system, wherein the IMU captures vehicle dynamics data representative of a state of motion of the vehicle, and wherein the vehicle dynamics data comprises (i) an acceleration of the vehicle and (ii) an angular velocity of the vehicle;

an electronic control unit (ECU) comprising electronic circuitry and associated software;

wherein vehicle dynamics data captured by the IMU is transferred to and is processed at the ECU;

wherein the vehicular control system, when the vehicle is at a first location on a road the vehicle is traveling along, determines the state of motion of the vehicle at the first location via processing of vehicle dynamics data captured by the IMU and transferred to the ECU, and wherein the state of motion is represented by a nine-dimensional vector comprising a translation, a rotation represented in exponential coordinates, and a body-frame linear velocity;

wherein the vehicular control system is operable to determine sensitivity of the state of motion of the vehicle to change in at least one selected from the group consisting of (i) pitch of the vehicle, (ii) roll of the vehicle and (iii) yaw of the vehicle by determining a Jacobian of a dynamic model of the state of motion;

wherein the vehicular control system determines the Jacobian representing the sensitivity of the state of motion of the vehicle at the first location;

wherein the vehicular control system, after the vehicle has traveled along the road from the first location, predicts a second location of the vehicle based on (i) the state of motion of the vehicle at the first location, (ii) the determined Jacobian and (iii) map data; and wherein the vehicular control system maneuvers the vehicle based on the predicted second location of the vehicle.

17. The vehicular control system of claim 16, wherein the vehicular control system determines an exponential coordinates representation of the state of motion of the vehicle.

18. The vehicular control system of claim 16, wherein the state of motion of the vehicle comprises (i) a position of the vehicle, (ii) a rotation of the vehicle, and (iii) a velocity of the vehicle.

19. The vehicular control system of claim 16, wherein the map data is derived from an output of a global positioning system of the vehicle.

20. The vehicular control system of claim 16, wherein the vehicular control system predicts the second location of the vehicle by predicting an initial second location of the vehicle based on the state of motion of the vehicle at the first location and adjusting the predicted initial second location of the vehicle based at least in part on (i) the determined sensitivity of the state of motion of the vehicle at the first location and (ii) a global positioning system of the vehicle.

\* \* \* \* \*